United States Patent [19]
Boscher et al.

[11] Patent Number: 5,345,523
[45] Date of Patent: Sep. 6, 1994

[54] TWO PATH CONNECTION SYSTEM FOR MONOMODE OPTICAL FIBERS

[75] Inventors: Daniel Boscher; Jean-Charles Brault, both of Trebeurden, France

[73] Assignee: France Telecom, Paris, France

[21] Appl. No.: 75,867

[22] Filed: Jun. 11, 1993

[30] Foreign Application Priority Data

Jun. 12, 1992 [FR] France .................. 92 07093

[51] Int. Cl.$^5$ ............................................. G02B 6/38
[52] U.S. Cl. .......................................................... 385/64
[58] Field of Search ................... 385/53, 60, 62, 64, 385/66, 67, 68, 78, 81, 82, 84, 137

[56] References Cited

U.S. PATENT DOCUMENTS 4,123,139 10/1978 Sandahl ................................. 385/64

FOREIGN PATENT DOCUMENTS

| | | |
|---|---|---|
| 2627021A1 | 6/1976 | Fed. Rep. of Germany . |
| 2931018A1 | 7/1979 | Fed. Rep. of Germany . |
| 57-181511 | 3/1981 | Japan . |
| 2152231 | 7/1985 | United Kingdom .................. 385/82 |
| 0423928A2 | 8/1990 | United Kingdom . |

*Primary Examiner*—Rodney B. Bovernick
*Assistant Examiner*—John Ngo
*Attorney, Agent, or Firm*—Blakely, Sokoloff, Taylor & Zafman

[57] ABSTRACT

A two-path connection system for monomode optical fibers is applicable to conventional telecommunication systems for connecting subscriber lines. The connection system includes a cylindrical envelope having an internal precision chamber. Two ferrules are engaged in the internal precision chamber, each for receiving a monomode optical fiber for connection. A spacer is engaged in the internal precision chamber which is suitable for securing the two ferrules while precentering them inside the precision chamber.

20 Claims, 1 Drawing Sheet

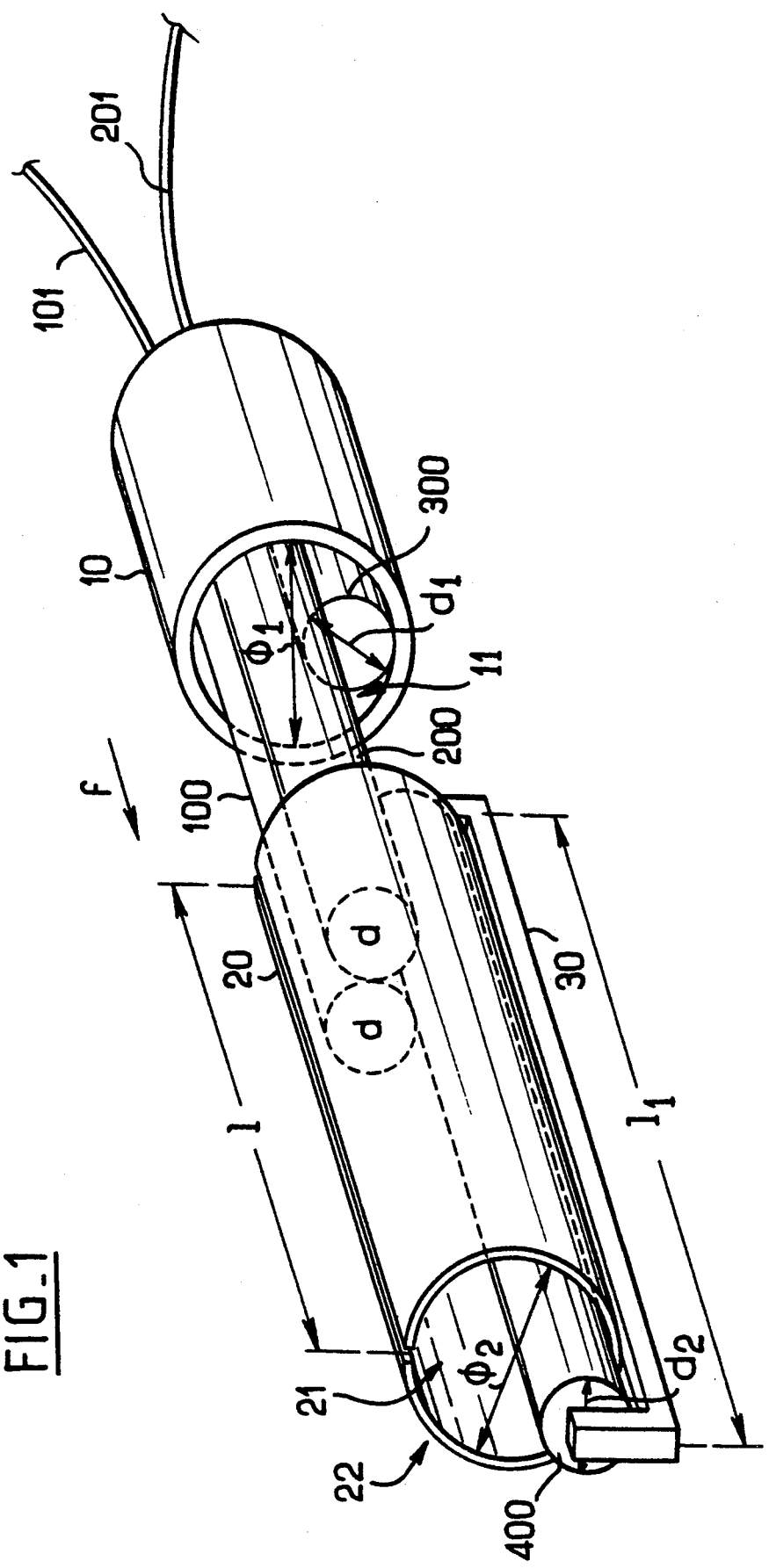
FIG_1

TWO PATH CONNECTION SYSTEM FOR MONOMODE OPTICAL FIBERS

The present invention relates to a two-path connection system for monomode optical fibers.

BACKGROUND OF THE INVENTION

A particularly advantageous application of the invention lies in establishing two-way links in any field where concepts of electrical or optical multiplexing are too expensive compared with a solution comprising two monomode optical fibers, and in particular in the field of conventional telecommunications for connecting subscriber lines.

At present, a technique for connecting multiple optical fibers is known from the Japanese publication by S. Nagasawa in IEE Photonics, Vol. 3, No. 10, Oct. 1991, which technique consists in a highly accurate factory step of prepositioning said optical fibers to be connected in respective coupling sleeves by means of a mechanical centering system, in taking two identical coupling sleeves each including respective accurately-positioned fibers to be connected, and then in accurately positioning the two coupling sleeves facing each other in such a manner that said optical fibers are in exact alignment, after which an overmolding operation is performed on both facing sleeves together.

That Japanese technique including an overmolding operation performed in a factory suffers from the drawback of using technological means that are unsuitable for implementing on a worksite.

OBJECTS AND SUMMARY OF THE INVENTION

In order to mitigate the drawbacks of the known prior art, the invention proposes a multifiber connector enabling a two-path connection of good optical quality to be made between monomode optical fibers, said connector being capable of being made from standard elements that are manufactured industrially and that are presently in use on a wide scale in the context of providing single-path connections with monomode optical fibers.

More particularly, the invention provides a two-path connection system for monomode optical fibers, the system comprising:
- at least one essentially cylindrical envelope including an internal precision chamber;
- at least two ferrules engaged in said internal precision camber and each receiving a monomode optical fiber to be connected; and
- at least one essentially cylindrical spacer also engaged in said precision chamber and being suitable for securing the two ferrules in said chamber, while still allowing them to be aligned.

In an embodiment of the connection system of the invention, the system comprises a first cylindrical envelope that is semirigid and closed including an internal precision chamber in which the two ferrules are engaged.

In addition, according to the invention, the two ferrules emerge axially from said semirigid closed first cylindrical envelope.

Thus, according to the invention, the said first semirigid cylindrical envelope, commonly called a sleeve, may advantageously be made of a metal like a sleeve for a conventional monomode connector, the assembly comprising the sleeve containing the two ferrules provided with their monomode optical fibers constituting a pre-wired endpiece for subsequent manual connection to another endpiece of the same type.

Furthermore, in an embodiment of the connection system of the invention, the system comprises a resilient second cylindrical envelope including a precision chamber in which the two ferrules are engaged.

Advantageously, said second envelope contains a floating cylindrical spacer of diameter $d_2$ such that said floating spacer comes tangentially into contact with said ferrules.

Thus, in accordance with the invention, said ferrules emerging from said first envelope and engaged in said second envelope are positioned and held securely in said second envelope by means of said cylindrical spacer. The ferrules are then ready to be connected to a set of two other ferrules forming a portion of a second prewired endpiece that is identical to the first and that is designed to be engaged in said resilient second envelope, said resilient second envelope constituting the body of the connection system.

It should be specified that all of the operations concerning assembly of the connection system of the invention are manual and are very easily performed on a worksite.

BRIEF DESCRIPTION OF THE DRAWING

The following description which refers to the accompanying drawing by way of non-limiting example shows clearly what the invention consists of and how it can be implement.

FIG. 1 is a fragmentary diagrammatic perspective view of the connection system of the invention.

MORE DETAILED DESCRIPTION

In FIG. 1, there can be seen a two-path connection system for monomode optical fibers. The connection system comprises a first cylindrical envelope 10 that is semirigid and closed, having an internal circularly cylindrical precision chamber 11 of diameter $\phi_1$ having two circularly cylindrical precision ferrules 100, 200 axially engaged therein in such a manner that the axes of said ferrules are parallel and that said ferrules emerge axially from said internal precision chamber. In addition, the ferrules 100, 200 have the same diameter d in this case.

The precision ferrules 100, 200 are in the form of tubes each having a central channel for receiving a monomode optical fiber 101, 201 that is to be connected.

More particularly, the first cylindrical envelope 10, commonly referred to by the person skilled in the art as a "sleeve" may be made of a metal such as that used in a known conventional monomode connector, or it made of an overmolded plastic with preguidance ducts for the optical fibers.

The ferrules 100, 200 are made of ceramic, glass, or silica, and the optical fibers 101, 201 are glued inside said ferrules, with the ends of the optical fibers being treated by overall polishing.

To obtain good optical transmission by means of monomode optical fibers connected by a two-path connection, the solutions currently used in the context of one-path connection, e.g. chamfered polishing, or bulging polishing for ensuring physical contact are inadequate and it is preferable to apply antireflection treatment to said fibers, e.g. as described in French patent No. 2 632 735 to CNET.

In addition, an essentially circularly cylindrical spacer 300 is also axially engaged inside the precision chamber 11 of said sleeve 10 so that the axis of the spacer 300 is parallel to the axes of the ferrules 100, 200. Said stationary spacer 300 is a piece of ferrule of substantially the same length as the sleeve and having a diameter $d_1$ such that once installed in said precision chamber, said spacer 300 comes tangentially into contact with said ferrules 100 and 200 so as to secure them and precenter them inside the sleeve.

The assembly constituted by the sleeve 10 in which said ferrules 100 and 200 "wired" with their optical fibers is referred to as a "wired endpiece".

In the embodiment of FIG. 1, the diameter $\phi_1$ of the precision chamber 11 may be equal to 2.5 mm, for example, and the diameter d of said precision ferrules 100 and 200 may be equal to the diameter $d_1$ of the stationary spacer 300. Under such circumstances, it can be shown that the nominal diameter d of all three ferrules 100, 200, and 300 can be written as a function of said diameter $\phi_1$ by means of the following equation:

$$d = \left( \frac{3}{3 + 2\sqrt{3}} \right) \phi_1 \quad (1)$$

which, for a diameter $\phi_1$ equal to 2.5 mm, gives a diameter d equal to 1.16 mm.

The three ferrules 100, 200, and 300 then take up an equilateral position within said sleeve 10.

Naturally, when the precision ferrules 100 and 200 have a diameter d that differs slightly from the nominal value specified above by an amount $\delta d$, then the diameter $d_1$ of the spacer 300 should differ from said diameter $d_1$ to compensate for the difference $\delta d$ in the diameter d. The variation $\delta d_1$ in said diameter $d_1$ about its nominal value can then be expressed as a function of the difference $\delta d$ by the following equation:

$$\delta d_1 = -\tfrac{3}{8}\delta d \quad (2)$$

Furthermore, we emphasize that the value of 2.5 mm for the diameter $\phi_1$ is a standard value for a standard connection sleeve as presently in use in 99% of single-path connectors, and that ceramic ferrules having a diameter of about 1.2 mm are easily made in a factory because of the technical progress that has been made over the last few years in the machining of ceramic ferrules. In technical terms, the accuracy of machining performed in a factory is presently to within less than 1 micrometer, and in economic terms, the cost of machining a ferrule lies in the range 10 francs to 20 francs.

Furthermore, the connection system of FIG. 1 includes a resilient second cylindrical envelope 20 having a circularly cylindrical precision chamber 21 of diameter $\phi_2$ which is equal in this case to the diameter $\phi_1$ of the precision chamber of the sleeve 10. This resilient second envelope 20 is designed to receive the precision ferrules 100 and 200 axially where they emerge axially from the sleeve 10, and it is commonly called a connector body.

More particularly, the resilient second envelope 20 is a cylindrical ceramic ring that is split along a generator line, identical to those used for a conventional single-path connector, or in a variant embodiment, it is a cylinder of elastomer having a Young's modulus of about 1 daN/mm$^2$.

In addition, the second cylindrical envelope 20 also contains a floating circularly cylindrical spacer 400 of diameter $d_2$ within its precision chamber 21 such that when the ferrules 100, 200 are axially engaged in said second envelope 20 via one of its ends, the floating spacer 400 comes tangentially into contact with said ferrules 100 and 200, the axis of said spacer 400 being parallel to the axes of said ferrules.

In the embodiment shown in FIG. 1, the diameter $d_2$ of said floating spacer 400 is equal to the diameter $d_1$ of the stationary spacer 300. It should be specified that like the diameter $d_1$, the diameter $d_2$ can be written down using above-specified equations (1) or (2), for the case where $d_2$ is equal to d, and for the case where $d_2$ is not equal to d, respectively.

The floating spacer 400 is suitable for securing said ferrules 100 and 200 inside the ring 200 in such a manner as to make it easy to manually position said ferrules 100 and 200 in face-to-face relationship with two other identical ferrules belonging to another wired endpiece (not shown) that is identical to that described above, the two other ferrules (not shown) being inserted into said ring 20 in the same manner, but through its other end 22.

In particular, the cylindrical floating spacer 400 has a length $l_1$ that is greater than or equal to the length $l$ of said split ring 20, and each of its ends is received in a bracket 30 extending outside said ring along a generator line. The bracket 30 is free to rotate about the outside surface of the split ring 20.

As a result, when the two wired endpieces are positioned at opposite ends of said split ring 20 so that each of the pairs of ferrules carrying monomode optical fibers is engaged inside the precision chamber 21 and is disposed substantially facing the other pair, the two wired endpieces are centered relative to each other, and the ferrules containing the optical fibers are brought as closely possible into alignment by means of the floating spacer 400 mounted on the bracket 30.

Once alignment has been achieved, the monomode optical fibers are interconnected and transmission conditions are very good.

It should be specified that the two-path connection system of FIG. 1 has very low insertion loss (of the order of 0.3 dB) and provides a very good reflection value for the interconnected monomode optical fibers.

Finally, it is specified that all of the connector components that are not shown and that are not described, namely the body for receiving the ring 20, the systems for securing the cables, the preguidance systems for the endpieces, the springs for providing mechanical bias, and the locking system, are all identical to standard elements known in conventional connectors.

We claim:

1. A two-path connection system for connecting monomode optical fibers comprising:

a first cylindrical envelope including a first internal precision chamber;

two ferrules engaged in said first internal precision chamber, each for receiving a monomode optical fiber to be connected;

a stationary cylindrical spacer engaged in said first internal precision chamber and being suitable for securing the two ferrules and precentering them inside the first internal precision chamber;

a second cylindrical envelope including a second internal precision chamber in which the two ferrules are engaged; and a floating cylindrical spacer mounted in said second internal precision chamber, and suitable for securing the two ferrules, while still allowing them to be aligned.

2. The connection system according to claim 1 wherein the first cylindrical envelope is semirigid and closed.

3. The connection system according to claim 1 wherein the stationary cylindrical spacer has a diameter $d_1$ such that said stationary cylindrical spacer installed in said first internal precision chamber comes tangentially into contact with said ferrules.

4. The connection system according to claim 2 wherein the two ferrules emerge axially from said semirigid closed first cylindrical envelope.

5. The connection system according to claim 1 wherein the second cylindrical envelope is made with a resilient material.

6. The connection system according to claim 1 wherein said floating cylindrical spacer has a diameter $d_2$ such that said floating cylindrical spacer comes tangentially into contact with said ferrules.

7. The connection system according to claim 1 wherein said floating cylindrical spacer is mounted at each end in a bracket external to said second cylindrical envelope and suitable for rotating thereabout.

8. The connection system according to claim 1 wherein said second envelope is resilient and of length 1, said floating cylindrical spacer being of length $l_1$ that is not less than said length 1.

9. The connection system according to claim 1 wherein the first envelope is semirigid and of diameter $\phi_1$, and the second envelope is resilient and of diameter $\phi_2$ that is identical to said diameter $\phi_1$.

10. The connection system according to claim 9 wherein the diameter $d_1$ of the stationary spacer is identical to the diameter $d_2$ of the floating spacer.

11. The connection system according to claim 1 wherein the two ferrules are of identical diameter d.

12. The connection system according to claim 11 wherein the diameter d of the ferrules is identical to the diameter $d_1$ of at least one of the cylindrical spacers.

13. The connection system according to claim 12 wherein the nominal diameter d of the ferrules can be written as a function of the diameter $\phi_1$ of the corresponding cylindrical envelope by the following equation:

$$d = \left(\frac{3}{3 + 2\sqrt{3}}\right)\phi_1.$$

14. The connection system according to claim 1 wherein the diameter d of the ferrules differs from the diameter $d_1$ of at least one of the cylindrical spacers by an amount $\delta d$ relative to the nominal value, and wherein the diameter $d_1$ of said corresponding cylindrical spacer differs from its nominal value d by the amount $\delta d_1$ that can be written as a function of the difference $\delta d$ by the equation:

$$\delta d_1 = -\tfrac{2}{3}\delta d.$$

15. The connection system according to claim 1 wherein the ferrules are made of ceramic.

16. The connection system according to claim 1 wherein the ferrules are made of glass.

17. The connection system according to claim 1 wherein the ferrules are made of silica.

18. A two-path connection system for connecting monomode optical fibers comprising:
 a first cylindrical envelope that is semirigid and closed, having a first internal circularly cylindrical precision chamber of diameter $\phi_1$;
 two ferrules each having a same diameter d, engaged in said first internal precision chamber and each for receiving a monomode optical fiber to be connected;
 a first stationary cylindrical spacer having a diameter $d_1$, engaged in said first internal precision chamber such that it comes tangentially into contact with said ferrules so as to secure them and precenter them inside the first chamber;
 a resilient second cylindrical envelope having a second internal circularly cylindrical precision chamber of diameter $\phi_2$ identical to said diameter $\phi_1$, in which the two ferrules are engaged;
 a second cylindrical spacer having a diameter $d_2$ identical to said diameter $d_1$, mounted at each end in a bracket external to said second envelope and suitable for rotating thereabout such that said second spacer comes tangentially into contact with said ferrules so as to secure them, while still allowing them to be aligned.

19. A two-path connection system for monomode optical fibers comprising:
 a first cylindrical envelope that is semirigid and closed, having a first internal circularly cylindrical precision chamber of diameter $\phi_1$;
 two ferrules each having a same diameter d, engaged in said first internal precision chamber and each for receiving a monomode optical fiber to be connected;
 a first stationary cylindrical spacer having a diameter $d_1$, engaged in said first internal precision chamber such that it comes tangentially into contact with said ferrules so as to secure them and precenter them inside the first chamber;
 a resilient second cylindrical envelope having a length 1 and including a second internal circularly cylindrical precision chamber of diameter $\phi_2$ identical to said diameter $\phi_1$ in which the two ferrules are engaged;
 a second floating cylindrical spacer having a length $l_1$ that is not less than said length 1 and a diameter $d_2$ identical to said diameter $d_1$ of said first cylindrical spacer, the floating spacer being mounted at each end in a bracket external to said second envelope and suitable for rotating thereabout such that the floating spacer secures said ferrules while still aligning them.

20. A two-path connection system for monomode optical fibers, comprising:
 a first cylindrical envelope that is semirigid and closed, having a first internal circularly cylindrical precision chamber of diameter $\phi_1$;
 two ferrules being of a same diameter d, engaged in said first precision chamber and emerging axially from said semirigid closed first cylindrical envelope, each ferrule for receiving a monomode optical fiber to be connected;
 a first stationary cylindrical spacer having a diameter $d_1$, engaged in said first internal precision chamber such that it comes tangentially into contact with said ferrules so as to secure them and precenter them inside the first chamber;

a resilient second cylindrical envelope having a length $l$ and including a second internal circularly cylindrical precision chamber of diameter $\phi_2$ identical to said diameter $\phi_1$ in which the two ferrules are engaged;

a second floating cylindrical spacer having a length $l_1$ that is not less than said length $l$ and a diameter $d_2$ identical to said diameter $d_1$ of said first cylindrical spacer, the floating spacer being mounted at each end in a bracket external to said second envelope and suitable for rotating thereabout such that the floating spacer secures said ferrules while still aligning them.

* * * * *